United States Patent Office 3,505,323
Patented Apr. 7, 1970

3,505,323
TETRAHYDRO-s-TRIAZIN-2-(1H)-ONES
AND THIONES
Raymond W. Luckenbaugh, Wilmington, Del., assignor to E. I. du Pont de Nemours and Company, Wilmington, Del., a corporation of Delaware
No Drawing. Original application Mar. 22, 1962, Ser. No. 181,792. Divided and this application Dec. 6, 1963, Ser. No. 328,469
Int. Cl. C07d 55/12; A01n 9/22
U.S. Cl. 260—248
15 Claims

ABSTRACT OF THE DISCLOSURE

Herbicidal compounds of the formula:

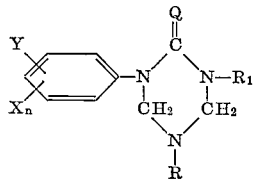

wherein

R is alkyl or cycloalkyl;
R is alkenyl, alkynyl, cycloalkyl, alkyl, hydroxyalkyl, chloroalkyl, methoxyalkyl and methylmercaptoalkyl;
Q is oxygen or sulfur;
X is hydrogen or halogen;
Y is hydrogen, halogen, alkyl, nitro, cyano, methoxy and trifluoromethyl; and
$n$ equals 1 or 2.

---

This application is a divisional application of any copending application Ser. No. 181,792, filed Mar. 22, 1962.

This invention relates to tetrahydro-s-triazinones and thiones and to herbicidal methods and compositions employing them.

More specifically, this invention concerns novel and old tetrahydro-s-triazin-2[1H]-ones and thiones, compositions containing them and their use as herbicides.

The active compounds in the compositions and methods of this invention are represented by the following general formula:

I

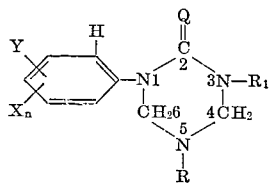

wherein $R_1$ is an alkyl group having 1 through 6 carbon atoms or cycloalkyl group having 3 through 8 carbon atoms;
R is alkenyl having 2 through 6 carbon atoms, alkynyl having 2 through 6 carbon atoms, cycloalkyl having 3 through 8 carbon atoms, alkyl, hydroxyalkyl, chloroalkyl, methoxyalkyl and methylmercaptoalkyl, where each one of the alkyl groups has 1 through 6 carbon atoms;

Q is oxygen or sulfur;
X is hydrogen or halogen;
Y is hydrogen, halogen, an alkyl group having 1 through 3 carbon atoms, nitro, cyano, methoxy and trifluoromethyl; and
$n$ equals 1 or 2.

The preferred compounds of this invention, because of their outstanding herbicidal effects, are novel and have the following structure:

II

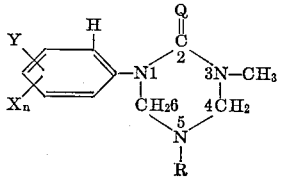

wherein

Q is oxygen or sulfur;
Y is hydrogen, halogen, an alkyl group having 1 through 3 carbon atoms, nitro, cyano, methoxy and trifluoromethyl;
X is hydrogen and halogen;
$n$ is 1 or 2; and
R is alkenyl having 2 through 6 carbon atoms, alkynyl having 2 through 6 carbon atoms, cycloalkyl having 3 through 8 carbon atoms, alkyl, hydroxyalkyl, chloroalkyl, methoxyalkyl and methylmercaptoalkyl, where each one of the alkyl groups has 1 through 6 carbon atoms.

Particularly preferred novel compounds because of their excellent use-cost ratio and ease of dissemination are those compounds of Formula II wherein Q is oxygen;
Y is hydrogen or halogen;
X is halogen;
$n$ is 1 or 2; and
R is an alkyl group having 1 through 4 carbon atoms.

PREPARATION

Compounds of this invention are prepared by either of two methods, as described in the Journal of Organic Chemistry, 26, 767 (1961).

The first method is explained by the following equation:

III

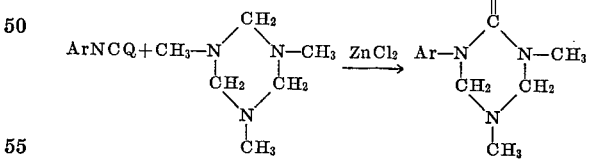

wherein

Ar is a substituted or unsubstituted aryl group and
Q is either oxygen or sulfur.

The two ingredients are heated in the presence of zinc chloride and preferably in a solvent such as an aromatic hydrocarbon. This process is used to advantage where the aryl isocyanates or isothiocyanates are solids.

The second method can be explained by the following equation:

IV

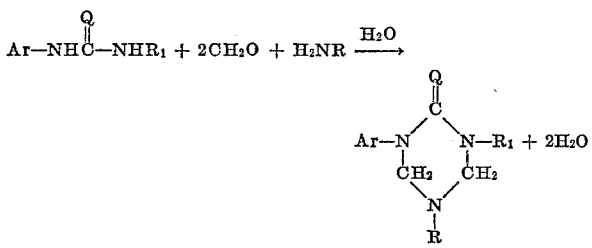

wherein

Ar is a substituted or unsubstituted aryl group and
Q, $R_1$ and R all have the same meaning as described for Formula I.

The starting materials used are made by routine methods as described in R. B. Wagner and H. D. Zook's "Synthetic Organic Chemistry," Wiley, 1956. This text describes the preparation of ureas in Chapter 28, isocyanates in Chapter 22 and isothiocyanates in Chapter 38.

Illustrative of novel tetrahydro-s-triazin-2[1H]-ones within the scope of this invention are the following:

(1) 1-phenyl-3,5-dimethyl-
(2) 1-(p-chlorophenyl)-3,5-dimethyl-
(3) 1-(3,4-dichlorophenyl)-3,5-dimethyl-
(4) 1-(2,4.5-trichlorophenyl)-3,5-dimethyl-
(5) 1-(m-nitrophenyl)-3,5-dimethyl-
(6) 1-(m-tolyl)-3,5-dimethyl-
(7) 1-(p-isopropylphenyl)-3,5-dimethyl-
(8) 1-(p-methoxyphenyl)-3,5-dimethyl-
(9) 1-(m-trifluoromethylphenyl)-3,5-dimethyl-
(10) 1-(m-cyanophenyl)-3,5-dimethyl-
(11) 1-(p-bromophenyl)-3,5-dimethyl-
(12) 1-(p-iodophenyl)-3,5-dimethyl-
(13) 1-(p-fluorophenyl)-3,5-dimethyl-
(14) 1-(3-chloro-4-isopropylphenyl)-3,5-dimethyl-
(15) 1-(3-chloro-4-nitrophenyl)-3,5-dimethyl-
(16) 1-(3-trifluoromethyl-4-chlorophenyl)-3,5-dimethyl-
(17) 1-(3,4-dibromophenyl)-3,5-dimethyl-
(18) 1-(3,4-difluorophenyl)-3,5-dimethyl-
(19) 1-(3-chloro-4-methoxyphenyl)-3,5-dimethyl-
(20) 1-(3-bromo-4-methylphenyl)-3,5-dimethyl-
(21) 1-(3,4-dichlorophenyl)-5-isopropyl-3-methyl-
(22) 1-(3,4-dichlorophenyl)-5-(3-methoxypropyl)-3-methyl-
(23) 1-(3,4-dichlorophenyl)-5-ethyl-3-methyl-
(24) 1-(3,4-dichlorophenyl)-5-allyl-3-methyl-
(25) 1-(3,4-dichlorophenyl)-5-propenyl-3-methyl-
(26) 1-(3,4-dichlorophenyl)-5-(2-chloroethyl)-3-methyl-
(27) 1-(3,4-dichlorophenyl)-5-(3-methylmercaptopropyl)-3-methyl-
(28) 1-(p-chlorophenyl)-5-ethyl-3-methyl-
(29) 1-(p-chlorophenyl)-5-isopropyl-3-methyl-
(30) 1-phenyl-5-isopropyl-3-methyl-
(31) 1-(3-chloro-4-isopropylphenyl)-5-isopropyl-3-methyl-
(32) 1-(p-bromophenyl)-5-isopropyl-3-methyl-
(33) 1-phenyl-5-cyclopropyl-3-methyl-
(34) 1-(3,4-dichlorophenyl)-5-cyclobutyl-3-methyl-
(35) 1-(p-chlorophenyl)-5-cyclooctyl-3-methyl-
(36) 1-(p-chlorophenyl)-5-hydroxymethyl-3-methyl-
(37) 1-(3,4-dichlorophenyl)-5-(2-hydroxybutyl)-3-methyl
(38) 1-(m-chlorophenyl)-5-(6-hydroxyhexyl)-3-methyl-
(39) 1-(3,4-dichlorophenyl)-5-(6-methoxyhexyl)-3-methyl-
(40) 1-(3,4-dichlorophenyl)-5-(6-chlorohexyl)-3-methyl-
(41) 1-(3,4-dichlorophenyl)-5-hexenyl-3-methyl-
(42) 1-(p-chlorophenyl)-5-(6-methylmercaptohexyl)-3-methyl-
(43) 1-(p-chlorophenyl)-5-hexyl-3-methyl-
(44) 1-(p-chlorophenyl)-5-propnyl-3-methyl-
(45) 1-(m-chlorophenyl)-5-butynyl-3-methyl-
(46) 1-(p-bromophenyl)-5-hexynyl-3-methyl- Illustrative of novel tetrahydro-s-triazin-2[1H]-thiones within the scope of this invention are the following:

(47) 1-phenyl-3,5-dimethyl-
(48) 1-(p-chlorophenyl)-3,5-dimethyl-
(49) 1-(3,4-dichlorophenyl)-3,5-dimethyl-
(50) 1-(2,4,5-trichlorophenyl)-3,5-dimethyl-
(51) 1-(m-nitrophenyl)-3,5-dimethyl-
(52) 1-(m-tolyl)-3,5-dimethyl
(53) 1-(p-isopropylphenyl)-3,5-dimethyl-
(54) 1-(p-methoxyphenyl)-3,5-dimethyl-
(55) 1-(m-trifluoromethylphenyl)-3,5-dimethyl-
(56) 1-(m-cyanophenyl)-3,5-dimethyl-
(57) 1-(p-bromophenyl)-3,5-dimethyl-
(58) 1-(p-iodophenyl)-3,5-dimethyl-
(59) 1-(p-fluorophenyl)-3,5-dimethyl-
(60) 1-(3-chloro-4-isopropylphenyl)-3,5-dimethyl-
(61) 1-(3-chloro-4-nitrophenyl)-3,5-dimethyl-
(62) 1-(3-trifluoromethyl-4-chlorophenyl)-3,5-dimethyl-
(63) 1-(3,4-dibromophenyl)-3,5-dimethyl-
(64) 1-(3,4-difluorophenyl)-3,5-dimethyl-
(65) 1-(3-chloro-4-methoxyphenyl)-3,5-dimethyl-
(66) 1-(3-bromo-4-methylphenyl)-3,5-dimethyl-
(67) 1-(3,4-dichlorophenyl)-5-(3-methoxypropyl)-3-methyl-
(68) 1-(3,4-dichlorophenyl)-5-isopropyl-3-methyl-
(69) 1-(3,4-dichlorophenyl)-5-ethyl-3-methyl-
(70) 1-(3,4-dichlorophenyl)-5-allyl-3-methyl-
(71) 1-(3,4-dichlorophenyl)-5-propenyl-3-methyl-
(72) 1-(3,4-dichlorophenyl)-5-(2-chloroethyl)-3-methyl-
(73) 1-(3,4-dichlorophenyl)-5-(3-methylmercaptopropyl)-3-methyl-
(74) 1-(p-chlorophenyl)-5-ethyl-3-methyl-
(75) 1-(p-chlorophenyl)-5-isopropyl-3-methyl-
(76) 1-phenyl-5-isopropyl-3-methyl-
(77) 1-(3-chloro-4-isopropylphenyl)-5-isopropyl-3-methyl-
(78) 1-(p-bromophenyl)-5-isopropyl-3-methyl-
(79) 1-phenyl-5-cyclopropyl-3-methyl-
(80) 1-(3,4-dichlorophenyl)-5-cyclobutyl-3-methyl-
(81) 1-(p-chlorophenyl)-5-cyclooctyl-3-methyl-
(82) 1-(p-chlorophenyl)-5-hydroxymethyl-3-methyl-
(83) 1-(3,4-dichlorophenyl)-5-(2-hydroxybutyl)-3-methyl-
(84) 1-(m-chlorophenyl)-5-(1-hydroxyhexyl)-3-methyl-
(85) 1-(3,4-dichlorophenyl)-5-(2-methoxyethyl)-3-methyl-
(86) 1-(3,4-dichlorophenyl)-5-(6-bromohexyl)-3-methyl-
(87) 1-(3,4-dichlorophenyl)-5-hexenyl-3-methyl-
(88) 1-(p-chlorophenyl)-5-(6-methylmercaptohexyl)-3-methyl-
(89) 1-(p-chlorophenyl)-5-hexyl-3-methyl-
(90) 1-(p-chlorophenyl)-5-propynyl-3-methyl-
(91) 1-(m-chlorophenyl)-5-butynyl-3-methyl-
(92) 1-(p-bromophenyl)-5-hexynyl-3-methyl- Illustrative of additional tetrahydro-s-triazin-2[1H]-ones used in this invention are the following:

(93) 1-(p-chlorophenyl)-3-cyclopentenyl-5-tert-butyl-
(94) 1-(p-chlorophenyl)-3-tert-butyl-5-cyclopentenyl-
(95) 1-(p-chlorophenyl)-3-cyclopropyl-5-tert-butyl-
(96) 1-(3,4-dichlorophenyl)-3-cyclooctyl-5-isopropyl-
(97) 1-(m-chlorophenyl)-3-cycloheptyl-5-ethyl-
(98) 1-(3-chloro-4-methylphenyl)-3-cycloheptyl-5-sopropyl- Illustrative of additional tetrahydro-s-triazin-2[1H]-thiones used in this invention are the following:

(99) 1-(p-chlorophenyl)-3-cyclopentenyl-5-tert-butyl-
(100) 1-(p-chlorophenyl)-3-tert-butyl-5-cyclopentenyl-
(101) 1-(p-chlorophenyl)-3-cyclopropyl-5-tert-butyl-
(102) 1-(3,4-dichlorophenyl)-3-cyclooctyl-5-isopropyl-
(103) 1-(m-chlorophenyl)-3-cycloheptyl-5-ethyl- (104) 1-(3-chloro-4-methylphenyl)-3-cycloheptyl-5-isopropyl-

USE

The compounds of this invention e.g., 1-(3,4-dichlorophenyl)-5-isopropyl-3-methyltetrahydro-s-triazin-2[1H]-one are particularly useful as selective post-emergence herbicides in such weedy species as wild oats, crabgrass, barnyardgrass, foxtail, Johnsongrass, lambsquarters, pigweed and velvetleaf in such crops as soybean, cotton, corn, sugar cane and like agricultural crops.

Compounds of this invention are also effective as pre-emergence herbicides in such crops as corn, sugar cane, sorghum, cotton, soybean and peanuts at rates of 0.5 to 4 pounds per acre. When used as a directed post-emergence spray, excellent weed control can be obtained at rates in the range of 0.5 to 4 pounds per acre. Besides their effectiveness against weeds in agricultural crops, compounds of this invention are also useful for industrial weed control. When used for this latter purpose, railway rights of way, airport runways, industrial plant grounds and the like can be kept clear of weeds by contacting said weeds with compounds of this invention at rates of up to 40 pounds per acre.

COMPOSITIONS

Herbicidal compositions of this invention will ordinarily comprise at least one compound of Formula I and one or more surfactants.

The surfactants or "surface-active agents" can include such anionic, cationic and non-ionic surface-active agents as heretofore have been generally employed in pest control compositions of similar type. Suitable surface-active agents are set out for example in Searle U.S. Patent 2,426,417; Todd U.S. Patent 2,655,447; Jones U.S. Patent 2,412,510; or Lenher U.S. Patent 2,139,276. A detailed list of such agents is set forth in "Detergents and Emulsifiers—Up to Date" (1960) by John W. McCutcheon, Inc., and Bulletin E–607 of the Bureau of Entomology and Plant Quarantine of the U.S. Department of Agriculture.

Suitable surfactants for use in compositions of the present invention are: polyethylene glycol fatty esters, polyethylene gylcol ethers with aliphatic alcohols and with alkylated phenols, fatty alkylol amide condensates, alkyl aryl sulfonates, fatty alcohol sulfonates, dialkyl esters of sodium sulfosuccinate, fatty acid esters of sodium isethionate, polyoxy ethylene thioethers and long chain quaternary ammonium chlorides.

Among the more preferred surfactants are those anionic and non-ionic agents recognized in the art as wetting agents, detergents or emulsifiers. Among anionic surfactants, preferred ones are alkali metal or amine salts of alkyl benzene sulfonic acids such as dodecylbenzene sulfonic acid, sodium lauryl sulfate, alkyl naphthalene sulfonates, sodium N-methyl-N-oleoyltaurate, oleic acid ester of sodium isethionate, dioctyl sodium sulfosuccinate, sodium dodecyldiphenyl oxide disulfonate. Among non-ionic compounds, the preferred members are alkyl phenoxy poly(ethyleneoxy)ethanols such as nonyl phenol adducts with ethylene oxide; trimethyl nonyl polyethylene glycol ethers, polyethylene oxide adducts of fatty and rosin acids, long chain alcohol or mercaptan adducts with ethylene oxides.

In general, less than 10% by weight of a surfactant will be used in compositions of this invention and ordinarily the amount of surfactant will be less than 1% by weight. However, additional surface-active agents can be added to the above formulation to increase the ratio of surface-active agent to active agent up to as high as 5 to 1 by weight.

In some compositions, such as the granules of formulation Example 59, below, the pellets of Example 60, below and some oil-extendable formulations, surfactants will not be necessary. In other instances, the compounds can be applied without any adjuvants, as will be understood by those skilled in the art.

The herbicidal compositions of this invention can contain, with or without surfactant, finely divided inert dilutents such as talcs, natural clays including kaolinites and attapulgite, pyrophyllite, diatomaceous earths, synthetic fine silicas, calcium silicate, carbonates, calcium phosphates, sulfur, lime and such flours as walnut shell, wheat, redwood, soybean and cottonseed.

The amount of the finely divided inert solid diluent can vary widely and can range from 10 to 98% by weight of the herbicidal composition.

Particle size can vary considerably but will ordinarily be somewhat under 50 microns in the finished formulation. Additionally, the inert solid diluent can be formulated into granules and pellets. In the granules it is preferred to have 2 to 4% by weight of a compound of this invention and in the pellets it is preferred to have 8 to 20% by weight.

Granules can be prepared by tumbling granulated clay with solutions of the active ingredient in solvents or with aqueous slurries of a wettable powder of an active ingredient, until the herbicide is distributed over or into the granules. It is also possible to mix clays with the active ingredient and thereafter granulating in the presence of moisture. Granules may range in size from +60 mesh to +4 mesh.

Pellets are prepared by mixing the herbicide with pelleting clays, lubricants, and the like, and compressing the mix into a tablet, or by moistening the clay pre-mix containing the herbicide, lubricant, disintegration aids and the like with water, extruding through a die, cutting the strands into the desired size and drying.

Among the preferred compositions of this invention are emulsifiable oil solutions. In these, the triazinone, the surface-active agent and an oil form a liquid which can be conveniently poured and measured. Such solutions can be mixed with water at the point of application to form an emulsion containing the herbicide and the surface-active agent. Such compositions have the advantage that the oil will often act as a foam inhibitor and thus reduce the tendency for large amounts of surfactants to form objectionable foam. It is also possible to include in such formulations oils which have herbicidal action of their own.

The oil used such as toluene, kerosene, stoddard solvent, xylene, alkylated naphthalenes, diesel oil, herbicidal oils such as Lion Herbicidal Oil No. 6 and the like should be preferably water immiscible and be of a type in which the active agent will be soluble in the amounts used in particular formulations.

In the herbicidal oil concentrations, the triazinones will be present in amounts ranging from 10 to 35% by weight. Precise concentrations of active agent, of course, will depend on the intended use of the composition. When mixed with water at the point of application, the oil concentration will be diluted so that in the final formulation the triazinone will be present in amounts ranging from 1 to 2% by weight.

APPLICATION

The method of applying compositions of this invention comprises applying triazinones of this invention, ordinarily in a herbicidal composition of one of the aforementioned types, to a locus or area to be protected from undesirable plant growth by contacting the active agent directly with the surface of the weeds. The active compound, of course, is applied in amounts necessary to exert the desired herbicidal action. The amount of the triazinone to be used in clearing lands of weeds will naturally depend on the conditions of the vegetation, the degree of herbicidal activity desired, the formulation used, the mode of application, the climate, the season of the year, and other variables. Recommendations as to precise amounts are, therefore, not possible. In general, however, direct foliage application as a liquid spray or dust to the locus to be protected using from 0.5 to 40 pounds per acre of the herbicidal compounds of this invention will be satisfactory.

Complete weed kill of vegetation is obtained with an extended residual period when the compounds are applied at rates of about 15 to 40 pounds of active per acre.

The following illustrative examples are provided so as to more clearly describe the invention and to make it more understandable. It should be understood that all percentages are by weight.

Example 1

Eleven and nine-tenths parts by weight of phenylisocyanate is added dropwise over 16 minutes to a mixture of 25 parts by weight of 1,3,5-trimethylhexahydrotriazine and 0.2 part by weight of fresh zinc chloride. The temperature of the mixture is kept below 25° C. during the addition with ice-water bath cooling. Following the addition the mixture is heated on a steam bath for three hours. There is obtained a viscous yellow oil, $n_D^{25}$ 1.5232. Pure 1 - phenyl - 3,5 - dimethyltetrahydro-s-triazin-2[1H]-one is obtained by distillation. There is obtained 7.4 parts by weight boiling at 170–174° C./0.8 mm. pressure, $n_D^{25}$ 1.5727.

*Analysis.*—Calc'd for $C_{11}H_{15}N_3O$ (percent): N, 20.5. Found (percent): N, 19.7.

Example 2

Twenty-five and eight-tenths parts by weight of 1,3,5-trimethylhexahydrotriazine is dissolved in 100 parts by volume of toluene. To this is added 0.2 part by weight of zinc chloride. A solution of 15.4 parts by weight of p-chlorophenylisocyanate in 25 parts by volume of toluene is added dropwise over 15 minutes. The temperature of the mixture is kept below 25° C. during the addition with ice bath cooling. Following the addition the mixture is refluxed for three hours. The mixture is evaporated in vacuo on a steam bath to yield 26.5 parts by weight of clear yellow viscous glass, $n_D^{25}$ 1.5806. The crude product is further purified by dissolving in methylene dichloride and washing twice with water. The organic layer is dried over anhydrous magnesium sulfate and treated with decolorizing carbon. The filtrate is evaporated in vacuo to yield 16 parts by weight of 1-(p-chlorophenyl)-3.5-dimethyltetrahydro-s-triazin-2-[1H]-one, as a clear yellow glass, $n_D^{25}$ 1.5809.

*Analysis.*—Calc'd for $C_{11}H_{14}ClN_3O$ (percent): Cl, 14.8; N, 17.6. Found (percent): Cl, 15.3; N, 15.0.

Example 3

Twenty-five and eight-tenths parts by weight of 1,3,5-trimethylhexahydrotriazine is dissolved in 100 parts by volume of toluene. To this is added 0.2 part by weight of zinc chloride. A solution of 18.8 parts by weight of 3,4-dichlorophenylisocyanate in 25 parts by volume of toluene is added dropwise over 8 minutes. The temperature is kept below 25° C. during the addition with ice bath cooling. Following the addition the mixture is refluxed three hours. The mixture is cooled to room temperature and washed with brine. The organic layer is dried over anhydrous magnesium sulfate and then treated with decolorizing carbon. The solvent is evaporated in vacuo on a steam bath using a water pump. There is obtained a yellow viscous oil, 23 parts by weight, $n_D^{25}$ 1.5782 which consists of 90% 1-(3,4-dichlorophenyl)-3,5-dimethyltetrahydro - s - triazin-2[1H]one and 10% toluene.

*Analysis.*—Calc'd for $C_{11}H_{13}N_3Cl_2O$ (percent): N, 13.7; Cl, 23.3. Found (percent): N, 13.9; Cl, 23.3.

Examples 4–20

Using the procedure in Example 3 the following products are obtained by the use of the listed amounts of isocyanate for the 18.8 parts of 3,4-dichlorophenylisocyanate.

TABLE I

| Ex. No. | Isocyanate | Wt. used | Tetrahydro-s-triazin-2[1H]-ones |
|---|---|---|---|
| 4 | 2,4,5-trichlorophenyl- | 22.3 | 1-(2,4,5-trichlorophenyl)-3,5-dimethyl- |
| 5 | m-Nitrophenyl- | 16.4 | 1-(m-nitrophenyl)-3,5-dimethyl- |
| 6 | m-Tolyl- | 13.3 | 1-(m-tolyl)-3,5-dimethyl- |
| 7 | p-Isopropylphenyl- | 16.1 | 1-(p-isopropylphenyl)-3,5-dimethyl- |
| 8 | p-Methoxyphenyl- | 14.9 | 1-(p-methoxyphenyl)-3,5-dimethyl- |
| 9 | m-Trifluoromethylphenyl- | 18.7 | 1-(m-trifluoromethylphenyl)-3,5-dimethyl- |
| 10 | p-Cyanophenyl- | 14.4 | 1-(p-cyanophenyl)-3,5-dimethyl- |
| 11 | p-Bromophenyl- | 19.8 | 1-(p-bromophenyl)-3,5-dimethyl- |
| 12 | p-Iodophenyl- | 24.5 | 1-(p-iodophenyl)-3,5-dimethyl- |
| 13 | p-Fluorophenyl- | 13.3 | 1-(p-fluorophenyl)-3,5-dimethyl- |
| 14 | 3-chloro-4-isopropylphenyl- | 18.6 | 1-(3-chloro-4-isopropylphenyl)-3,5-dimethyl- |
| 15 | 3-chloro-4-nitrophenyl- | 19.9 | 1-(3-chloro-4-nitrophenyl)-3,5-dimethyl- |
| 16 | 3-trifluoromethyl-4-chlorophenyl- | 22.2 | 1-(3-trifluoromethyl-4-chlorophenyl)-3,5-dimethyl- |
| 17 | 3,4-dibromophenyl- | 27.7 | 1-(3,4-dibromophenyl)-3,5-dimethyl- |
| 18 | 3,4-difluorophenyl- | 15.3 | 1-(3,4-difluorophenyl)-3,5-dimethyl- |
| 19 | 3-chloro-4-methoxyphenyl- | 18.5 | 1-(3-chloro-4-methoxyphenyl)-3,5-dimethyl- |
| 20 | 3-bromo-4-methylphenyl- | 21.2 | 1-(3-bromo-4-methylphenyl)-3,5-dimethyl- |

Example 21

To a solution of 17.1 parts by weight of 1,3,5-triethylhexahydrotriazine in 100 parts of toluene is added 0.2 part by weight of zinc chloride. To this mixture is added a solution of 28.2 parts by weight of 3,4-dichlorophenylisocyanate in 75 parts of toluene. Addition time required is 12 minutes and the reaction mixture warms from 24 to 27° C. The solution is heated at reflux for 2½ hours. After washing with water, drying over anhydrous magnesium, treating with decolorizing carbon, and filtering, the organic layer is evaporated in vacuo on a steam bath at >1 mm. pressure. There is obtained crude 1-(3,4-dichlorophenyl) - 3,5-diethyltetrahydro-s-triazin-2-[1H]-one, $n_D^{25}$ 1.5720.

*Analysis.*—Calc'd for $C_{13}H_{17}N_3Cl_2O$ (percent): Cl, 23.5; N, 13.9. Found (percent): Cl, 22.8; N, 11.0.

Example 22

By the procedure described in Example 21 11.1 parts by weight of cyclohexylmethylenimine in 100 parts of toluene is treated with 0.2 part of zinc chloride and 11.9 parts by weight of phenylisocyanate. A crude solid, 9.5 parts by weight is obtained after isolation, M.P. 126–129° C. Purification by recrystallization from 100 ml. of cyclohexane yields 5 parts of 1-phenyl-3,5-dicyclohexyltetrahydro-s-triazin-2-[1H]-one, M.P. 134–135° C.

*Analysis.*—Calc'd for $C_{21}H_{31}N_3O$ (percent): N, 12.3. Found (percent): N, 12.2.

Example 23

To a mixture of 15.4 parts by weight of 3-(3,4-dichlorophenyl)-1-methylurea and 4.2 parts by weight of isopropylamine there is added 11.7 parts by weight of aqueous formaldehyde (36–38% active). An exothermic reaction occurs. The mixture is then heated on a steam bath. After 10 minutes all the solid is dissolved and a two phase liquid system forms. Heating is continued overnight. The mixture is extracted with methylene dichloride, treated with decolorizing carbon and dried over anhydrous magnesium sulfate. After filtering the mixture, the solvent is removed at <0.4 mm. pressure on a steam bath. There is obtained 17.7 parts by weight of essentially pure 1-(3,4-dichlorophenyl)-3-isopropyl-5-methyl-tetrahydro - s - triazin-2[1H]-one, $n_D^{25}$ 1.5762. It is very viscous oil which crystallizes to a low melting solid on standing.

*Analysis.*—Calc'd for $C_{13}H_{17}Cl_2N_3O$ (percent): Cl, 23.5; N, 13.9. Found (percent): Cl, 23.8; N, 13.4

Example 24

To a mixture of 21.9 parts by weight of 3-(3,4-dichlorophenyl)-1-methylurea and 8.9 parts by weight of 3-methoxypropylamine is added 16.7 parts by weight of aqueous formaldehyde (36–38%). The reaction is exothermic, the temperature increases from 26 to 56° C. in a few minutes. After the exotherm ceases the mixture is stirred on a steam bath overnight. The product is purified as in Example 21, i.e. extracted with methylene dichloride, treated with decolorizing carbon, dried and solvent evaporated. There is obtained 19.5 g. of a very viscous oil $n_D^{24}$ 1.5673 which chiefly consists of 1-(3,4-dichlorophenyl)-5-(3-methoxypropyl)-3-methyltetrahydro-s-triazin-2[1H]-one.

*Analysis.*—Calc'd for $C_{14}H_{19}Cl_2N_3O_2$ (percent): Cl, 21.4; N, 12.6. Found (percent): Cl, 22.2; N, 11.9.

Example 25

A mixture of 32.9 parts by weight of 1-(3,4-dichlorophenyl)-3-methylurea and 11.0 parts by weight of tertiary butylamine is treated with 25 parts by weight of aqueous (36–38%) formaldehyde. The temperature rises slowly to 40° C. The mixture is heated overnight on a steam bath. The mixture is then cooled and extracted with methylene dichloride. The solution is washed with water, decolorizing carbon treated, and the solvent evaporated. There is obtained 29.6 parts of a yellow viscous oil, $n_D^{25}$ 1.5737. This oil crystallizes on cooling from a hot solution of 100 parts of n-butyl ether. There is thus obtained 11 parts by weight of pure 1-(3,4-dichlorophenyl)-3-methyl-5-tert-butyltetrahydro-s-triazin-2[1H]-one, M.P. 111–112.5° C.

*Analysis.*—Calc'd for $C_{14}H_{19}Cl_2N_3O$ (percent): N, 13.3; Cl, 22.4. Found (percent): N, 13.3; Cl, 21.7.

Example 26

By the exact procedure described in Example 25 using sec.-butylamine in place of tert.-butylamine 1-(3,4-dichlorophenyl)-3-methyl-5-sec.-butyl-tetrahydro-s-triazin-2-[1H]-one is obtained as a viscous oil, 33.4 parts by weight, $n_D^{25}$ 1.5713.

*Analysis.*—Calc'd for $C_{14}H_{19}Cl_2N_3O$ (percent): Cl, 22.4; N, 13.3. Found (percent): Cl, 22.7; N, 11.0.

Examples 27–38

Using the procedure in Example 24 in which the following weights of urea and amine are used with 16.7 parts of aqueous formaldehyde (36–38%). The following products are obtained.

Example 39

A mixture of 1-methyl-3-phenyl-2-thiourea, 24.9 parts by weight, and 8.4 parts by weight of isopropylamine is treated with 25.1 parts by weight of aqueous (36–38%) formaldehyde. The exothermic reaction is kept below 45° C. with cooling. It is gradually heated to 80° C. over a 1 hour period and kept at that temperature for 6 hours. The solid is filtered from the reaction mixture. There is obtained 38 parts by weight of a tacky white solid. Recrystallization from 500 ml. of n-butyl ether yields 19 parts of 1-methyl-3-phenyl-5-isopropyltetrahydro-s-triazin-2[1H]-thione, M.P. 81.5–82.5° C.

*Analysis.*—Calc'd for $C_{13}H_{19}N_3S$ (percent): N, 16.9. Found (percent): N, 16.8.

Example 40

By the procedure described in Example 39 a mixture of 20.0 parts of 1-methyl-3-p-chlorophenyl-2-thiourea and 5.9 parts of isopropylamine is treated with 16.7 parts of aqueous (36–38%) formaldehyde. There is obtained 34 parts of solid with a M.P. 108–138° C. Recrystallization from 600 parts of n-butyl ether yields 20 parts of 1-(p-chlorophenyl)-5-isopropyl-3-methyltetrahydro-s-triazin-2[1H]-thione, M.P. 141–142.5° C.

*Analysis.*—Calc'd for $C_{13}H_{18}ClN_3$ (percent): Cl, 12.5; N, 14.8. Found (percent): Cl, 12.3; N, 14.6.

Example 41

1-methyl-3-phenyl-2-thiourea, 24.9 parts by weight and 3-methoxypropylamine is treated with 25.1 parts of aqueous (36–38%) formeldehyde. The reaction mixture, after heating at 80–85° C. for 6 hours, is extracted with methylene dichloride. The solution is dried over anhydrous magnesium sulfate and treated with decolorizing carbon. Evaporation of the solvent yields 31.7 parts by weight of viscous oil $n_D^{25}$ 1.5960. Crystallization from 150 parts of n-butyl ether yields 15.5 parts of 1-methyl-3-phenyl-3-(3-methoxypropyl)-tetrahydro-s-triazin-2[1H]-thione, M.P. 49–51° C.

*Analysis.*—Calc'd for $C_{14}H_{21}N_3OS$ (percent): N, 15.0. Found (percent: N, 15.0.

Example 42

Using the procedure described in Example 1, 13.5 parts by weight of phenylisothiocyanate is used in place of the 11.9 parts of phenylisocyanate. The mixture is heated 24 hours on a steam bath to yield 1-phenyl-3,5-dimethyltetrahydro-s-triazine-2[1H]thione, M.P. 72–80° C.

*Analysis.*—Calc'd for $C_{11}H_{15}N_3S$ (percent): S, 14.4 N, 19.0 Found (percent): S, 14.9; N, 16.5.

TABLE II

| Ex. No. | Urea | Wt. | Amine | Wt. | Tetrahydro-s-triazin-2[1H]-one |
|---|---|---|---|---|---|
| 27 | 3-(3,4-dichlorophenyl)-1-methyl. | 21.9 | Ethyl | 4.5 | 1-(3,4-dichlorophenyl)-5-ethyl-3-methyl. |
| 28 | do | 21.9 | Allyl | 5.7 | 1-(3,4-dichlorophenyl)-5-allyl-3-methyl. |
| 29 | do | 21.9 | Propynyl | 5.5 | 1-(3,4-dichlorophenyl)-3-methyl-5-propynyl. |
| 30 | do | 21.9 | 2-chloroethyl | 8.0 | 1-(3,4-dichlorophenyl)-5-(2-chloroethyl)-3-methyl. |
| 31 | do | 21.9 | 3-methylmercaptopropyl. | 10.5 | 1-(3,4-dichlorophenyl)-5-(3-methyl-mercaptopropyl)-3-methyl. |
| 32 | 1-(p-chlorophenyl)-3-methyl. | 18.5 | Ethyl | 4.5 | 1-(p-chlorophenyl)-5-ethyl-3-methyl |
| 33 | do | 18.5 | Isopropyl | 5.9 | 1-(p-chlorophenyl)-5-isopropyl-3-methyl. |
| 34 | 1-methyl-3-phenyl | 15.0 | do | 5.9 | 1-phenyl-5-isopropyl-3-methyl. |
| 35 | 1-(3-chloro-4-isopropylphenyl)-3-methyl. | 22.5 | do | 5.9 | 1-(3-chloro-4-isopropylphenyl)-5-isopropyl-3-methyl. |
| 36 | 1-(p-bromophenyl)-3-methyl. | 22.7 | do | 5.9 | 1-(p-bromophenyl)-5-isopropyl-3-methyl. |
| 37 | 3-(3,4-dichlorophenyl)-1-methyl. | 21.9 | Isoamyl | 7.7 | 1-(3,4-dichlorophenyl)-5-isoamyl-3-methyl. |
| 38 | 1-methyl-3-phenyl | 15.0 | n-Hexyl | 9.1 | 1-phenyl-5-(n-hexyl)-3-methyl. |

Examples 43–48

Additional tetrahydro-s-triazin-2-[1H]-thiones which are prepared by the procedure of Example 39 using a like amount by weight of the appropriate starting material are the following.

Ex.: Tetrahydro-s-triazin-2[1H]-thiones
- 43 ........ 1-(3,4-dichlorophenyl)-5-isopropyl-3-methyl-
- 44 ........ 1-(p-chlorophenyl)-5-ethyl-3-methyl-
- 45 ........ 1-(p-bromophenyl)-5-allyl-3-methyl-
- 46 ........ 1-(p-cyanophenyl)-3,5-dimethyl
- 47 ........ 1-(p-nitrophenyl)-3,5-dimethyl-
- 48 ........ 5-isopropyl-3-methyl-1-phenyl-

Example 49

The following wettable powder is applicable to any liquid or low melting solid as described in the examples above.

| | Percent |
|---|---|
| 1-(3,4-dichlorophenyl)-5-isopropyl-3-methyl-tetrahydro-s-triazin-2[1H]-one | 25.00 |
| Alkyl napthalene sulfonic acid, Na salt | 1.00 |
| Low viscosity methyl cellulose | 0.25 |
| Attapulgite clay | 73.75 |

The above compents are blended and micropulverized until the liquid active material is uniformly distributed and absorbed upon the carrier clay.

This compostion is extended with water to form a sprayable formulation containing 1% by weight of the active ingredient. It is applied at a rate of 2 pounds of active ingredient per acre to a newly-prepared field planted to cotton. Good control of annula broadleaf weeds, such as mustard, chickweed, pigwed, and lambsquarters and grass weeds, such as crabgrass and foxtail, is obtained without affecting normal growth of cotton.

Examples 50-55

The following additional compounds can be formulated and used in the method described in Example 49 by substituting those compounds for the 1-(3,4-dichlorophenyl)-5-isopropyl-3-methyltetrahydro-s-triazin-2[1H]-one in Example 49 in like amount by weight.

Ex.:
- 50 ........ 1-(3,4-dichlorophenyl)-5-tert.-butyl-3-tert.-butyl-tetrahydro-s-triazin-2-[1H]-one.
- 51 ........ 1-(3,4-dichlorophenyl)-5-cyclohexyl-3-methyl-tetrahydro-s-triazin-2[1H]-one.
- 52 ........ 1-(3,4-dichlorophenyl)-5-cyclopentyl-3-n-butyl-tetrahydro-s-triazin-2[1H]-one.
- 53 ........ 1-(p-chlorophenyl)-5-sec.-butyl-3-methyl-tetrahydro-s-triazin-2[1H]-thione.
- 54 ........ 1-phenyl-5-cyclooctyl-3-methyl-tetrahydro-s-triazin-2[1H]-one.
- 55 ........ 1-(3,4-dichlorophenyl)-3-methyl-5-(2-hydroxyethyl)-s-tetrahydro-s-triazin-2[1H]-one.

Example 56

The following wettable powder is suitable for nearly any compound described above which melts above 90° C.

| | Percent |
|---|---|
| 1-(3,4-dichlorophenyl)-5-tert.-butyl-3-methyl-tetrahydro-s-triazin-2[1H]-one | 50 |
| Dioctyl sodium sulfosuccinate | 1 |
| Sodium lignin sulfonate | 1 |
| Diatomaceous silica | 48 |

This formulation can be extended with water and applied as a directed spray around nursery and ornamental foxtail, barnyardgrass, pigweed, lambsquarters, cocklebur, chickweed, and pigweed. Rates of 2-4 pounds (active) per acre give good control of weeds in conjunction with excellent growth of yews, arbor vitae, firethorn and red cedar.

Example 57

The above composition is also made up as a tank mix containing high levels of surfactants and applied as a directed post-emergence spray at the rate of 1.5 pounds of the herbicide and 2 pounds of trimethylnonylpolyethyleneglycol ether (6 moles ethylene oxide) in 30 gallons of water to a vigorously growing infestation of annual weeds in cotton at lay-by time. The weeds should be in the range of two to five inches high when sprayed.

The weeds controlled include yellow, green and giant foxtail, barnyardgrass, pigweed, lambsquarters, cocklebur, and velvetleaf. Without the surfactant, about 3 to 4 pounds of the herbicide would be required for equivalent control.

Example 58

The following emulsifiable oil can be extended with either oil or water.

| | Percent |
|---|---|
| 1-(3,4-dichlorophenyl)-5-isopropyl-3-methyl-tetrahydro-s-triazin-2[1H]-one | 25 |
| A blend of polyoxyethylene ethers and oil soluble sulfonates | 5 |
| Alkylated naphthalene (principally alpha-methylnaphthalene) | 70 |

This formulation is extended with water and applied at a rate of 3 pounds of active ingredient per acre as a directed spray to a field of established cotton. Seedling weeds approximately one to three inches in height at the time of spraying are killed without injury to the cotton. Weeds which are seriously injured or killed include barnyardgrass, giant foxtail, seedling Johnsongrass, crabgrass and pigweed.

When applied at the rate of 30 pounds (active) per acre in 60 gallons of oil this formulation also gives excellent control of quackgrass, volunteer wheat, cheat and wild barley growing along a railroad right-of-way.

Example 59

The following granular formulation is applicable to any liquid triazinone.

| | Percent |
|---|---|
| 1-phenyl-3,5-dimethyl-tetrahydro-s-triazin-2[1H]-one | 2 |
| 15-30 mesh attaclay granules | 98 |

The liquid active material is warmed to 50.60° C. to reduce viscosity and is then sprayed in fine droplets upon a tumbling mass of attapulgite granules.

These granules are applies with a conventional spreader as a pre-emergence treatment to weeds. They give good control of annual weds at 3 pounds of active ingredient per acre. Crabgrass, foxtail, velvetleaf and pigweed are controlled.

Example 60

The following pellet formulation is applicable to any solid triazinone.

| | Percent |
|---|---|
| 1-(p-chlorophenyl)-5-isopropyl-3-methyl-tetrahydro-s-triazin-2[1H]-one | 10 |
| Ca, Mg sub bentonite | 80 |
| Anhydrous sodium sulfate | 10 |

The above components are blended and micropulverized then moistened with 15-20% water and extruded through ⅛ inch die holes, cutting the extrusion into approximately ⅛ inch lengths. The pellets thus formed are then dried.

These pellets when applied at rates of 20-30 pounds of active ingredient per acre give good weed control around industrial fences. Crabgrass, foxtail, barnyardgrass, wild mustard, pigweed, annual bluegrass and beggarticks are controlled.

Example 61

The following ingredients:

| | Percent |
|---|---|
| 1-phenyl-3,5-dimethyltetrahydro-s-triazin-2[1H]-one | 25 |
| attapulgite | 73 |
| dioctyl sodium sulfosuccinate | 1 |
| partially desulfonated sodium lignin sulfate | 1 | are blended together and then are applied as a directed spray around nursery and ornamental plantings for control of annual weeds, such as cragrass, chickweed and pigweed. Rates of 2-4 pounds of active per acre give good weed control.

Examples 62–164

The compounds listed above numbered 2–104 are substituted one at a time for the 1-phenyl-3,5-dimethyltetrahydro-s-triazin-2[1H]-one of Example 61 in like amount by weight and are formulated in the same manner.

Application at 2–4 pounds of active per acre gives substantially like results as are obtained using the formulation of Example 61.

I claim:
1. A compound represented by the formula:

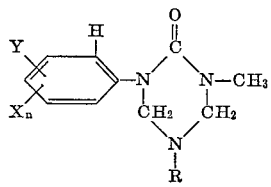

wherein
Q is selected from the group consisting of oxygen and sulfur;
Y is selected from the group consisting of hydrogen, halogen, an alkyl group having 1 through 3 carbon atoms, nitro, cyano, methoxy and trifluoromethyl;
X is selected from the group consisting of hydrogen and halogen;
$n$ is a whole positive integer less than 3; and
R is selected from the group consisting of alkenyl having 2 through 6 carbon atoms, alkynyl having 2 through 6 carbon atoms, cycloalkyl having 3 through 8 carbon atoms, alkyl having 1 through 6 carbon atoms, hydroxyalkyl having 1 through 6 carbon atoms, chloroalkyl having 1 through 6 carbon atoms and methoxyalkyl and methylmercaptoalkyl where each one of the alkyl groups has 1 through 6 carbon atoms.

2. A compound represented by the formula

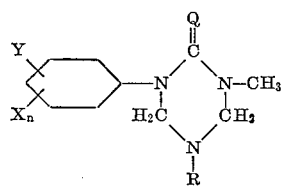

wherein
Q is selected from the group consisting of oxygen and sulfur;
X is selected from the group consisting of hydrogen and halogen;
Y is seletced from the group consisting of hydrogen, methoxy, lower alkyl, and nitro;
$n$ is a whole positive integer less than 3; and
R is selected from the group consisting of lower alkenyl, lower alkyl, hydroxy lower alkyl, and methoxy lower alkyl.

3. A compound represented by the formula:

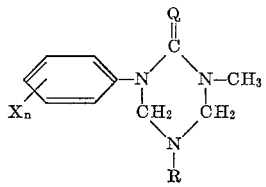

wherein
Q is selected from the group consisting of oxygen and sulfur;
X is selected from the group consisting of hydrogen and halogen;
$n$ is a whole positive integer less than 3; and
R is selected from the group consisting of lower alkenyl, lower alkyl, hydroxy lower alkyl, and methoxy lower alkyl.

4. A compound represented by the formula:

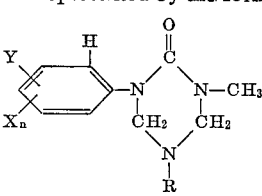

wherein
R is alkyl of 1 through 4 carbon atoms;
Y is hydrogen or halogen;
X is halogen; and
$n$ is a whole positive integer less than 3.

5. 1 - phenyl - 3,5-dimethyltetrahydro-s-triazin-2(1H)-one.

6. 1 - (p-chlorophenyl) - 3,5-dimethyltetrahydro-s-triazin-2(1H)-one.

7. 1 - (3,4 - dichlorophenyl)-3,5-dimethyltetrahydro-s-triazin-2(1H)-one.

8. 1 - (p - bromophenyl)-3,5-dimethyltetrahydro-s-triazin-2(1H)-one.

9. 1 - (3,4-dichlorophenyl) - 3 - methyl-5-ethyltetrahydro-s-triazin-2(1H)-one.

10. 1 - (3,4-dichlorophenyl)-3-methyl-5-isopropyltetrahydro-s-triazin-2(1H)-one.

11. 1 - (3,4 - dichlorophenyl) - 3 - methyl-5-tertbutyltetrahydro-s-triazin-2(1H)-one.

12. 1-(p - chlorophenyl) - 3 - methyl-5-sec-butyltetrahydro-s-triazin-2(1H)-one.

13. 1-(3,4 - dichlorophenyl) - 3 - methyl-5-isopropyltetrahydro-s-triazin-2(1H)-one.

14. 1-(p - chlorophenyl) - 3 - methyl-5-ethyltetrahydro-s-triazin-2(1H)-one.

15. 1 - (p - chlorophenyl)-3-methyl-5-isopropyltetrahydro-s-triazin-2(1H)-one.

References Cited

UNITED STATES PATENTS

| | | | |
|---|---|---|---|
| 2,304,624 | 12/1942 | Burke | 260—248 |
| 2,826,500 | 3/1958 | Keim | 260—248 |

FOREIGN PATENTS 966,283  8/1964  Great Britain.

HENRY R. JILES, Primary Examiner

J. M. FORD, Assistant Examiner

U.S. Cl. X.R.

71—93